(12) United States Patent
Hansen et al.

(10) Patent No.: US 6,732,900 B2
(45) Date of Patent: May 11, 2004

(54) FRICTION STIR WELDING SPINDLE WITH AXIALLY DISPLACEABLE SPINDLE SHAFT

(75) Inventors: Matthew J. Hansen, Minneapolis, MN (US); John A. Bushey, Eden Prairie, MN (US); Michael F. Nemeth, Brooklyn Park, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 10/115,264

(22) Filed: Apr. 2, 2002

(65) Prior Publication Data

US 2003/0183673 A1 Oct. 2, 2003

(51) Int. Cl.[7] .............................................. B23K 20/12
(52) U.S. Cl. ..................................... 228/2.1; 228/112.1
(58) Field of Search ................................ 228/112.1, 2.1

(56) References Cited

U.S. PATENT DOCUMENTS

| | | | |
|---|---|---|---|
| 3,817,439 A | 6/1974 | Kiwalle et al. ................ 228/2 |
| 3,949,896 A | 4/1976 | Luc ............................... 220/75 |
| 4,144,110 A | 3/1979 | Luc ............................ 156/73.5 |
| 5,460,317 A | 10/1995 | Thomas et al. ........... 228/112.1 |
| 5,486,262 A | 1/1996 | Searle ......................... 156/580 |
| 5,518,562 A | 5/1996 | Searle et al. ............... 156/73.8 |
| 5,558,265 A | 9/1996 | Fix, Jr. ......................... 228/2.3 |
| 5,678,749 A | 10/1997 | Pratt et al. ................... 228/2.1 |
| 5,697,544 A | 12/1997 | Wykes ......................... 228/2.1 |
| 5,713,507 A | 2/1998 | Holt et al. ................. 228/112.1 |
| 5,718,366 A | 2/1998 | Colligan ................... 228/112.1 |
| 5,739,607 A | 4/1998 | Wood, III ................... 310/90.5 |
| 5,769,306 A | 6/1998 | Colligan ................... 228/112.1 |
| 5,893,507 A | 4/1999 | Ding et al. ................... 228/2.1 |
| 6,019,013 A | * 2/2000 | Luik ........................ 74/490.01 |
| 6,050,475 A | * 4/2000 | Kinton et al. ............ 228/112.1 |
| 6,102,636 A | * 8/2000 | Geise ........................... 409/231 |
| 6,199,745 B1 | 3/2001 | Campbell et al. ......... 228/112.1 |
| 6,264,088 B1 | * 7/2001 | Larsson ....................... 228/2.1 |
| 6,299,050 B1 | * 10/2001 | Okamura et al. ......... 228/110.1 |
| 6,302,315 B1 | * 10/2001 | Thompson ................ 228/112.1 |
| 6,421,578 B1 | * 7/2002 | Adams et al. ............... 700/212 |
| 6,497,355 B1 | * 12/2002 | Ding et al. ................... 228/2.1 |
| 6,499,649 B2 | * 12/2002 | Sayama et al. ........... 228/112.1 |
| 6,540,128 B2 | * 4/2003 | Hirano et al. ............. 228/112.1 |
| 2002/0179673 A1 | 12/2002 | Strombeck et al. ........... 228/1.1 |

FOREIGN PATENT DOCUMENTS

| | | |
|---|---|---|
| DE | 199 57 136 C | 8/2001 |
| EP | 0 968 788 A | 5/2000 |
| JP | 2001205459 A | * 7/2001 |
| WO | WO 01/28732 A1 | * 4/2001 |
| WO | WO 01/36144 A1 | * 5/2001 |

OTHER PUBLICATIONS

U.S. 2002/0179682 A1, Schilling et al., Dec. 5, 2002.*
U.S. 2002/0179674 A1, Schilling et al., Dec. 5, 2002.*
U.S. 2002/0027155 A1, Okamura et al., Mar. 7, 2002.*
U.S. 2003/0029903 A1, Kashiki et al., Feb. 13, 2003.*
U.S. 2002/0145031 A1, Hirano et al., Oct. 10, 2002.*
U.S. 2003/0057261 A1, Holman et al., Mar. 27, 2003.*
Translation of JP–2001205459.*

* cited by examiner

Primary Examiner—Kiley Stoner
(74) Attorney, Agent, or Firm—Westman, Champlin & Kelly, P.A.; S. Koehler (57) ABSTRACT

A friction stir welding spindle includes a support having a center bore. A spindle shaft is adapted to support a stir welding tool and extends within the bore. A bearing assembly allows simultaneous rotational and axial displacement of spindle shaft in the bore relative to the support. A sensing device is adapted to provide an output signal indicative of at least one of a force coincident with axial displacement of the spindle shaft and an axial position of the spindle shaft.

31 Claims, 6 Drawing Sheets

FRICTION STIR WELDING SPINDLE WITH AXIALLY DISPLACEABLE SPINDLE SHAFT

BACKGROUND OF THE INVENTION

The present invention relates to a friction stir welding machine. More particularly, the present invention relates to a spindle for a friction stir welding machine.

Friction stir welding is a process of welding component parts together using friction heat generated at a welding joint to form a plasticized region that solidifies to join workpiece sections. Welding is performed by inserting a probe into a joint between the workpiece sections. The probe includes a pin that is inserted into the joint and a shoulder, which is urged against the surfaces of the workpieces. The pin and shoulder spin together to generate friction heat to form the plasticized region along the joint for welding operation.

Various parameters must be controlled in order to form a quality weld. One of the more critical parameters is the depth of the probe. As is known in the art, the depth of the probe can be controlled using either position or load control. Position control is generally difficult because of the high loads present on the spindle during the welding process. In particular, the spindle and the probe are under a considerable load, which will cause flexure and bending in various components thereof, which in turn will affect the accuracy of the position measurement. In view that the spindle must also operate in multiple degrees of freedom, the individual loading on the components of the spindle can vary depending on the position of the spindle in space. In addition, thermal expansion of the probe must also be taken into account in position control.

Load control has also been used to control the welding process. Load control requires measuring the normal load or force on the welding probe (i.e. the force coincident with the spinning axis of the probe). Prior art techniques for load control require supporting the whole spindle assembly on one or more load cells. Since the spindle assembly is commonly quite heavy, the load cells used must be of large capacity, which increases the cost of the machine and as well as generally sacrificing accuracy.

SUMMARY OF THE INVENTION

One aspect of the present invention is a friction stir welding spindle that includes a support having a center bore. A spindle shaft is adapted to support a stir welding tool and extends within the bore. A bearing assembly allows simultaneous rotational and axial displacement of spindle shaft in the bore relative to the support. A sensing device is adapted to provide an output signal indicative of at least one of a force coincident with axial displacement of the spindle shaft and the axial position of the spindle shaft.

In another aspect of the present invention, a portion of the spindle shaft cooperates with the support, forming an actuator adapted to cause axial displacement of the spindle shaft relative to the support. For instance, the actuator can be fluidly operated from pressurized fluid wherein the portion of the spindle shaft cooperates with the inner surface of the bore to form pressurizable chambers which, when pressurized, will cause axial displacement of the spindle shaft relative to the support. Pneumatic or hydraulic operation can be employed. In yet other embodiments, the spindle shaft and the support can cooperate magnetically to form an actuator.

DETAILED DESCRIPTION OF THE ILLUSTRATIVE EMBODIMENTS

Figure 1:
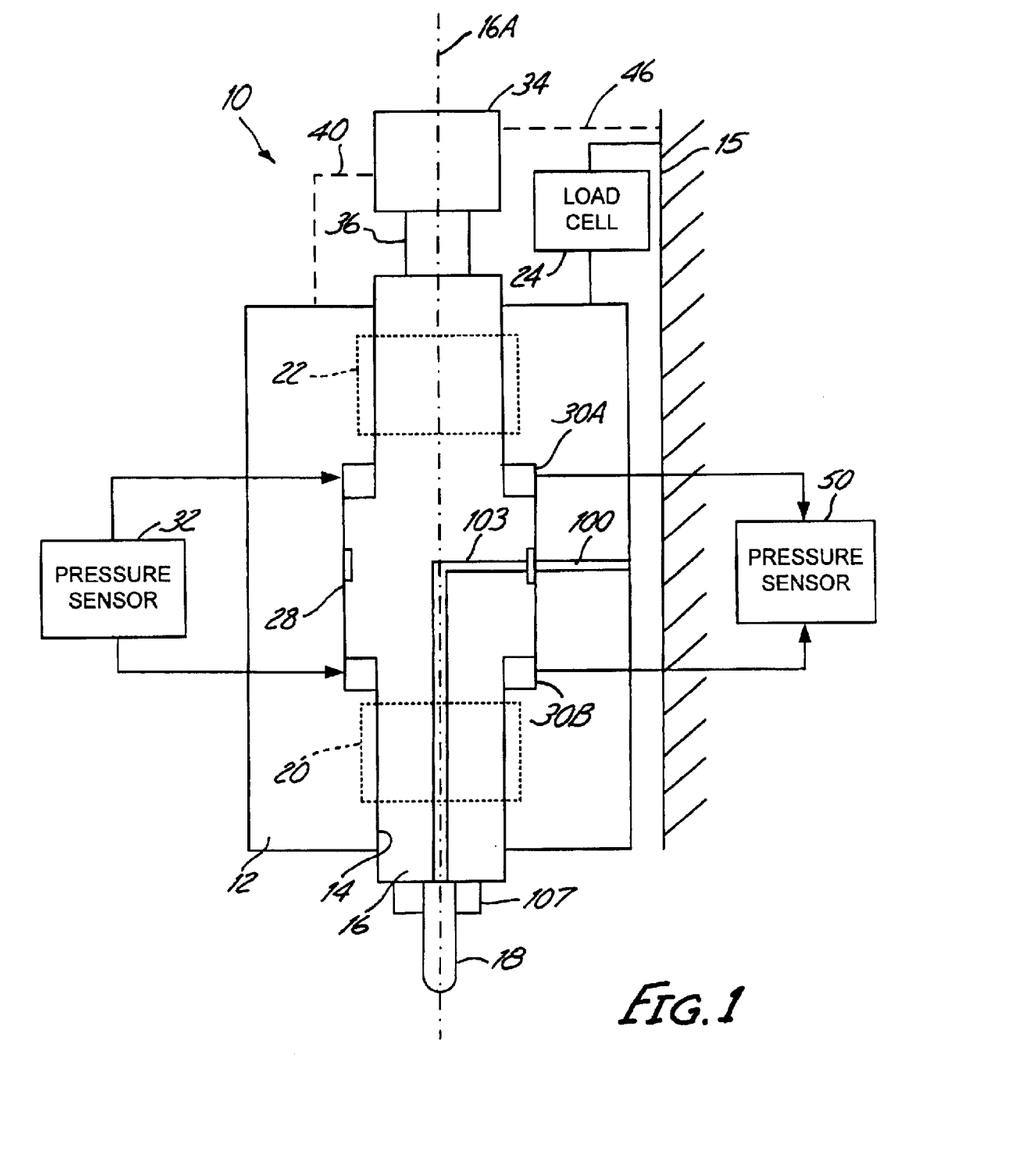
FIG. 1 is a schematic representation of a spindle assembly of the present invention.
Figure 2:
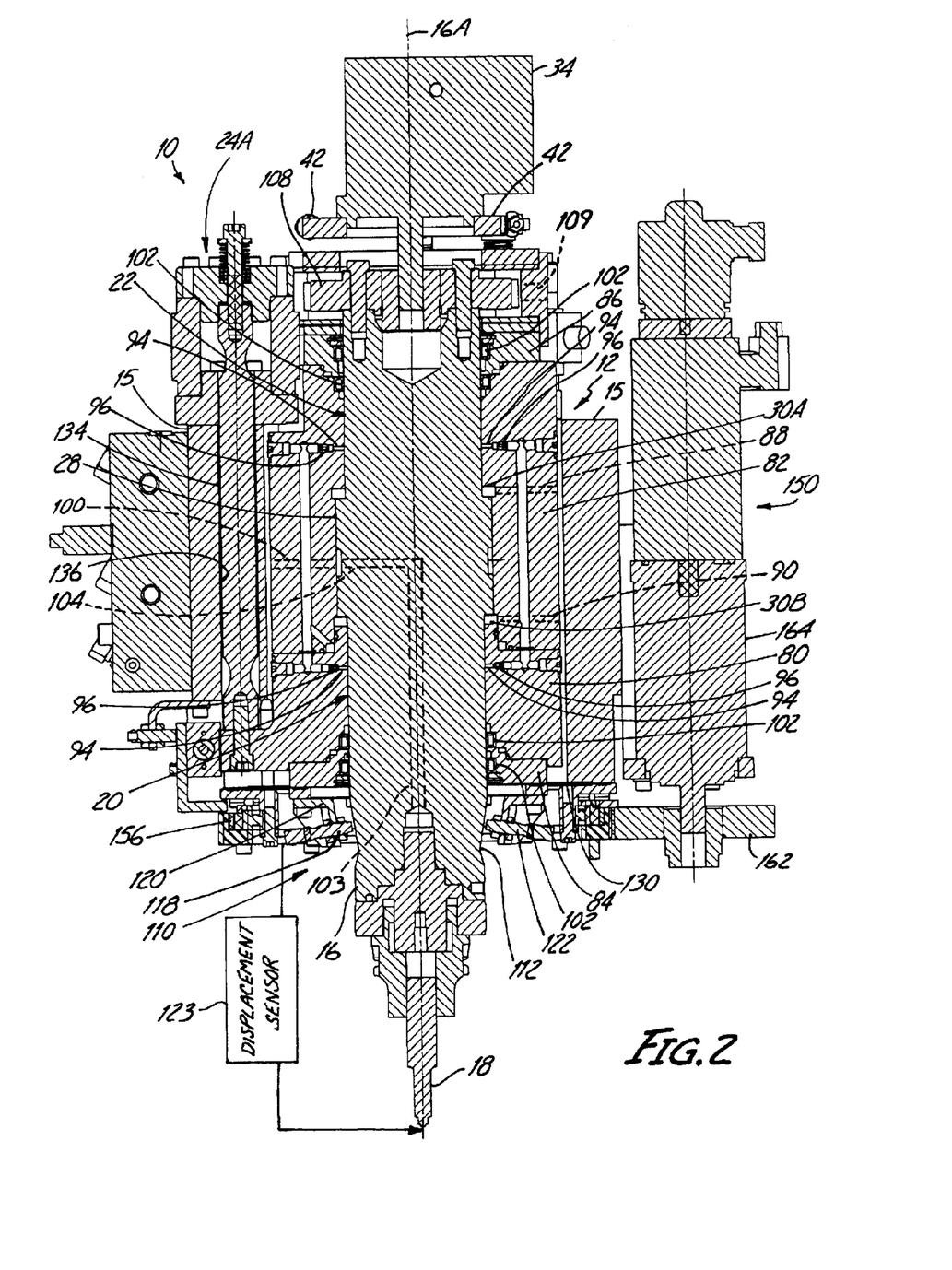
FIG. 2 is a sectional view of an exemplary embodiment of a spindle assembly.

A schematic illustration of a friction stir welding spindle assembly 10 incorporating aspects of the present invention is illustrated in FIG. 1. The spindle assembly 10 includes a inner support 12 having a center bore 14 and an outer base 15. A spindle shaft 16 is disposed in the bore 14 and is adapted to support a stir welding tool 18. At least one bearing assembly 20, 22 allow simultaneous rotational and axial displacement of the spindle shaft 16 in the bore 14 relative to the support 12. A sensing device, for example, load cell 24, is operably coupled to the spindle shaft 16 and is adapted to provide an output signal indicative of a force coincident with axial displacement of the spindle shaft along an axis 16A. By allowing axial and rotational displacement of the spindle shaft 16, the load sensing device, such as load cell 24, need not carry the entire weight of the spindle assembly 10, in particular the weight of the base 15. In addition, the load sensing device has greater fidelity with the force along the spindle axis 16A and thereby can provide a more accurate measurement thereof. The sensing device can also be a position sensor providing an output signal indicative of the axial position of the spindle shaft 16. The spindle assembly 10 is generally supported and positionable by actuators, not shown, connected to the base, but these components do not form part of the present invention.

In a further embodiment, the spindle shaft 16 and the support 12 form an actuator adapted to cause axial displacement of the spindle shaft 16 along the axis 16A. In FIG. 1, a portion 28 of the spindle shaft 16 is adapted to cooperate with the support 12 to form the actuator. For example, as illustrated, the support 12 can comprise a cylinder wherein the portion 28 of the spindle shaft 16 cooperates with the inner surface of the bore 14 to form pressurizable chambers 30A and 30B, which when pressurized from a pressure source 32 will cause axial displacement of the spindle shaft 16 relative to the support 12. By example and without limitation, the pressure source 32 can operate hydraulically providing a liquid fluid to the chambers 30A, 30B, or pneumatically providing fluid as a gas to the chambers 30A, 30B. In yet a further embodiment, the actuator can comprise an electromagnetic actuator wherein the portion 28 or another portion of the spindle shaft 16 can include permanent magnets or coils that cooperate with magnets or coils provided on support 12. In yet another embodiment, the actuator can be formed as a power screw.

A motor 34 is coupled to the spindle shaft 16 to rotate the spindle shaft 16 and thus, the tool 18. The motor 34 can be a hydraulic, pneumatic, or electromagnetic motor, or other similar device to rotate the spindle shaft 16. An output shaft of the motor 34 is coupled to the spindle shaft 16 with a coupling 36. In a first embodiment, the coupling 36 is rigid such that the motor 34 will be displaced along the spindle axis 16A along with the spindle shaft 16. In such a case, a link or other reaction structure (illustrated by dashed lines 40) couples the motor 34 to the support 12. Alternatively, a reaction structure or link (illustrated by dashed lines 46) can couple the motor 34 directly to the base 15. Again, since the coupling 36 is rigid, the reaction structures 40 or 46 must allow limited displacement of the motor 34 along the axis 16A.

In a further embodiment, the coupling 36 can be flexible, thereby allowing the spindle shaft 16 to move axially relative to the motor 34. In such an embodiment, the reaction structures 40 or 46 can be rigid, or otherwise omitted wherein the motor 34 is directly coupled to the support 12 or the spindle base 15.

As illustrated, the load sensing device can comprise a load cell 24 operably coupled to the spindle shaft 16 and the spindle base 15 (e.g. through support 12) so as to measure a force coincident with the axis 16A. Other suitable locations can be used for coupling the load cell 24 operably to the spindle shaft 16. For instance, the load cell 24 could also be coupled to the motor 34, if the motor 34 is rigidly coupled to the spindle shaft 16. Likewise, other load sensing devices can be used depending upon the type of actuator present in the system. For instance, a pressure sensor 50 can be operably coupled to the chambers 30A, 30B so as to sense pressures therein, and thereby provide an output signal indicative of the force coincident with the spindle axis 16A. Likewise, if the actuator formed between the spindle shaft 16 and the support 12 is an electromagnetic actuator, current and/or voltage can be measured to provide an output signal indicative of the force or load along spindle axis 16A.

As indicated above, the bearing assemblies 20, 22 allow simultaneous rotation and axial displacement of the spindle shaft 16 relative to the support 12. By way of example and not limitation, suitable bearing assemblies can comprise hydrostatic bearings (which can function as hydrodynamic bearings at high rotational speeds) pneumatic or air bearings, magnetic bearings, or the like.

The bearing assemblies 20 and 22 allow the spindle shaft 16 to have a limited range of motion in a degree of freedom co-axial with the tool 18. In this manner, the downward force into the joint to be welded can be controlled regardless of the orientation of the spindle assembly 10. Suitable sensors are provided so that the support 12 stays within the working range of travel of the spindle shaft 16.

FIGS. 2–6 illustrate an exemplary embodiment of the spindle assembly 10 of FIG. 1. The same reference numbers have been used where appropriate to identify similar elements and structure.

In the embodiment illustrated in FIGS. 2–6, the support cylinder 12 includes cylindrical elements 80 and 82, that form the pressurizable chambers 30A and 30B, and end members 84 and 86. Ports 88 and 90 are provided for selectively pressurizing chambers 30A and 30B, respectively.

In this embodiment, bearing assemblies 20 and 22 are disposed on opposite sides of the portion 28 and each comprises hydrostatic bearing elements. In particular, a plurality of pressurizable ports 94 (herein 4) are equally spaced about the spindle axis 16 and open to an inner surface of the bore 14 for each bearing assembly 20, 22. Each of the fluid passageways leading to the ports 94 includes a restrictor 96, wherein internal passageways between cylindrical elements 80 and 82 can also be provided to minimize coupling hoses from pressure source 32 (FIG. 1). It should be noted that although described as a hydrostatic bearing, the bearings 20 and 22 operate in this manner generally at low shaft speeds of the spindle shaft 16 wherein pressurized fluid fills the gap between the spindle shaft 16 and the inner surfaces of support 14 and slowly drains from the gap to a collection location as is well known in the art. However, at high shaft speeds, the principal operation of the bearings 20 and 22 is more similar to a hydrodynamic bearing. The gap between the spindle shaft 16 and the inner surfaces of the cylindrical elements 80 and 82 is chosen as to fulfill this requirement. However, as appreciated by those skilled in the art, the gap used will be chosen based on a number of considerations, such as, viscosity of the fluid, maximum temperature allowed for the fluid, materials used in the piston and bearing, level of filtration of the fluid, thermal growth of the parts, and fluid pressures used. Generally, the gap size is on the order of 0.001 inches for each inch in diameter of the spindle shaft 16. In view that the portion 28 and the pressurizable chambers 30A and 30B function as a fluid actuator, at higher shaft speeds, the fluid present in the gap between the spindle shaft 16 and the inner surfaces of the cylindrical elements 80 and 82 can heat up. The fluid in the gap between the actuator 28 and the cylindrical element 82 can also heat up. In order to prevent excess temperature of the fluid, and to provide a fresh supply of fluid, a drain port 100 is provided between the pressurizable chambers 30A and 30B so that fluid will be forced from the pressurizable chambers 30A and 30B through the gap to the drain port 100. Drain ports (not numbered but located just inward of the seals 102) are also located at the axially outward end of the bearings 20 and 22 so that fluid is also forced through the bearings. Suitable seals 102 are provided in the cylindrical elements 80 and 82 and the end members 84 and 86.

At this point, it should be noted that although the end of the spindle shaft 16 holding the tool 18 in this embodiment comprises a standard collet or chuck assembly requiring component parts thereof to be removed in order to exchange or replace tool 18, in a further embodiment, an automatically actuated tool holder (schematically illustrated in FIG. 1 at 107) generally known in the art can also be provided on the end of the spindle shaft 16 to hold the tool 18. Commonly, as is well known, fluid pressure is used to compress or otherwise release springs present in the tool holder, which in turn allows removal of the tool 18. However, in this embodiment of the invention, the spindle shaft 16 can include an internal passageway 103 leading from a port 104 in fluid communication with drain port 100. In this manner, when rotation of the spindle shaft 16 has stopped and it is now necessary to exchange or replace tool 18, pressurized fluid can be applied to drain port 100 and through internal passageway 104 to operate the pneumatic or hydraulic tool holder located at the end of the shaft 16. Use of the drain port 100 in this manner obviates the need for separate hoses and/or couplings to operate the tool holder.

Figure 3:
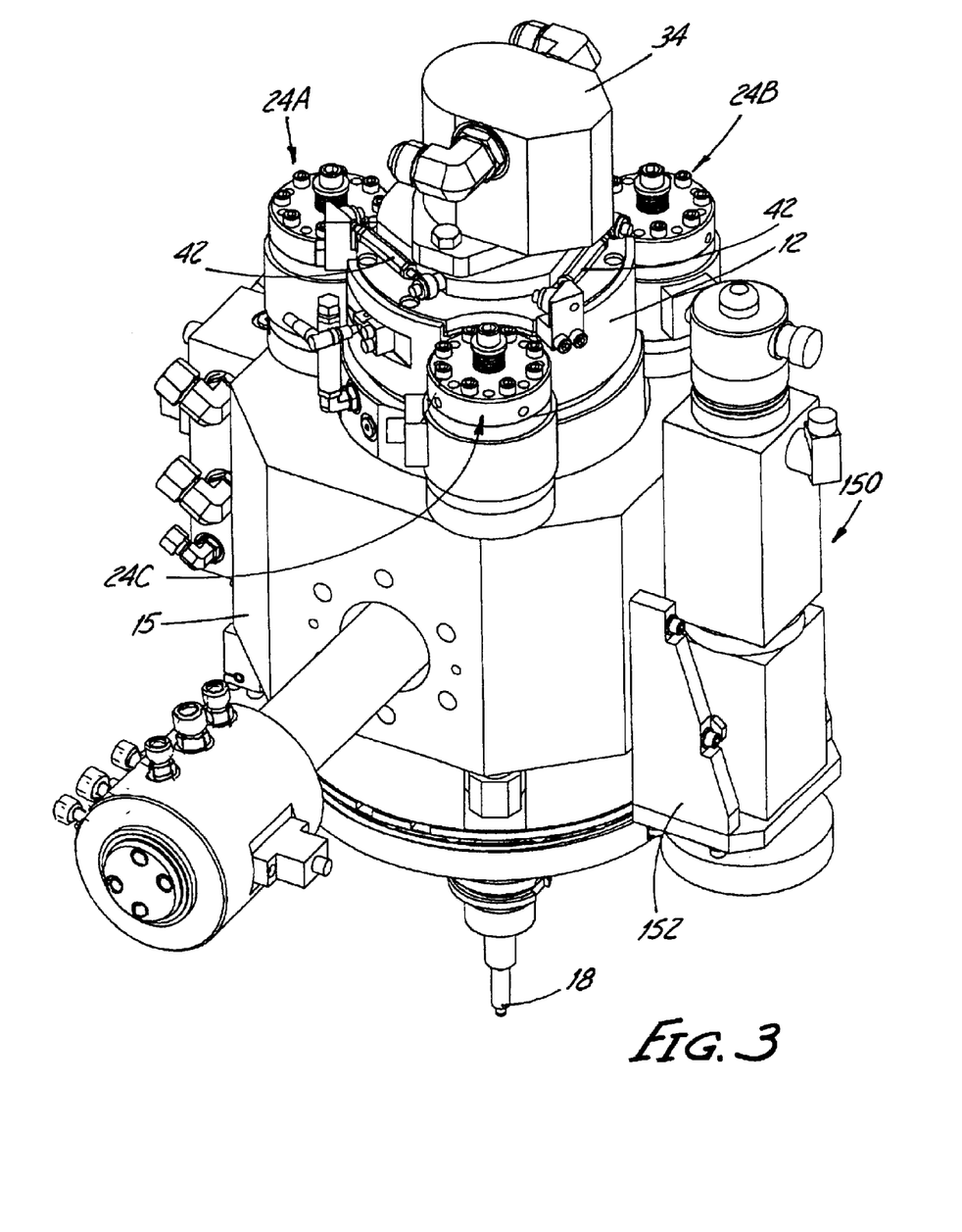
FIG. 3 is a perspective view of the spindle assembly of FIG. 2.
Figure 4:
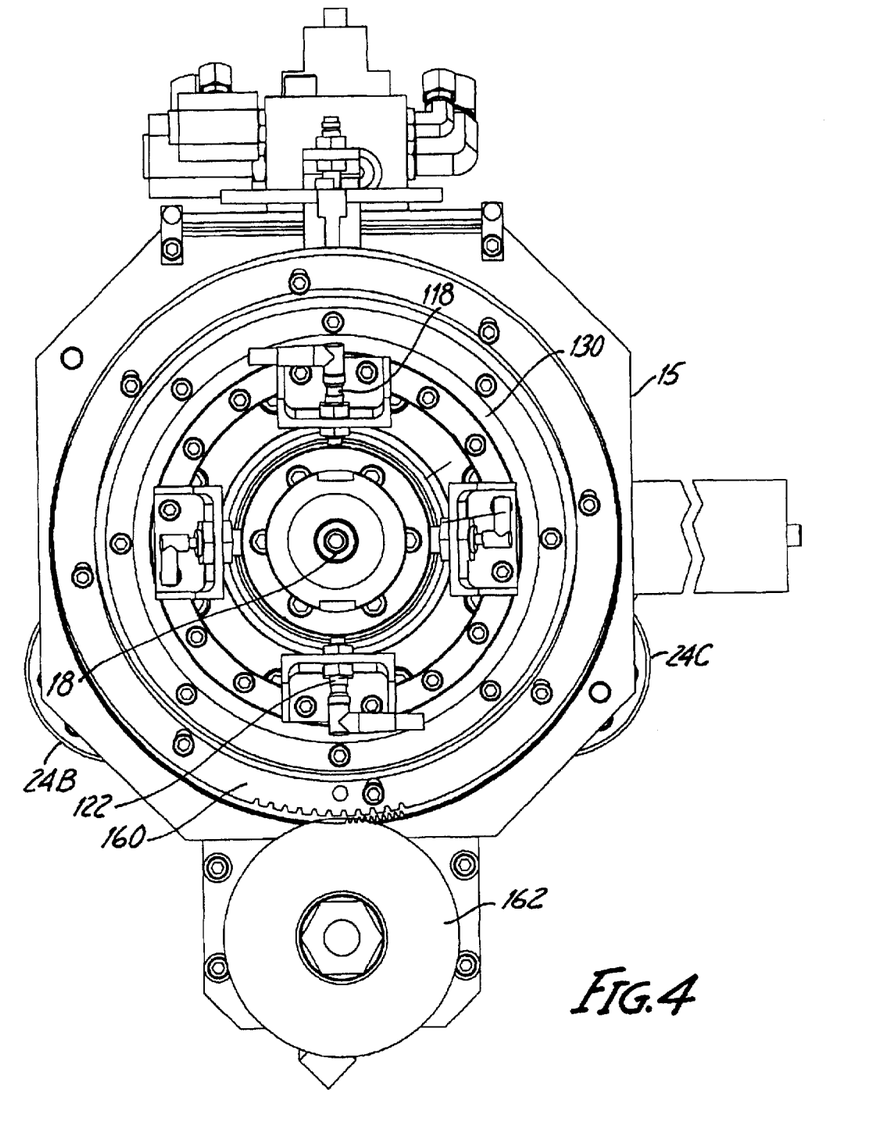
FIG. 4 is an end view of the spindle assembly.
Figure 5:
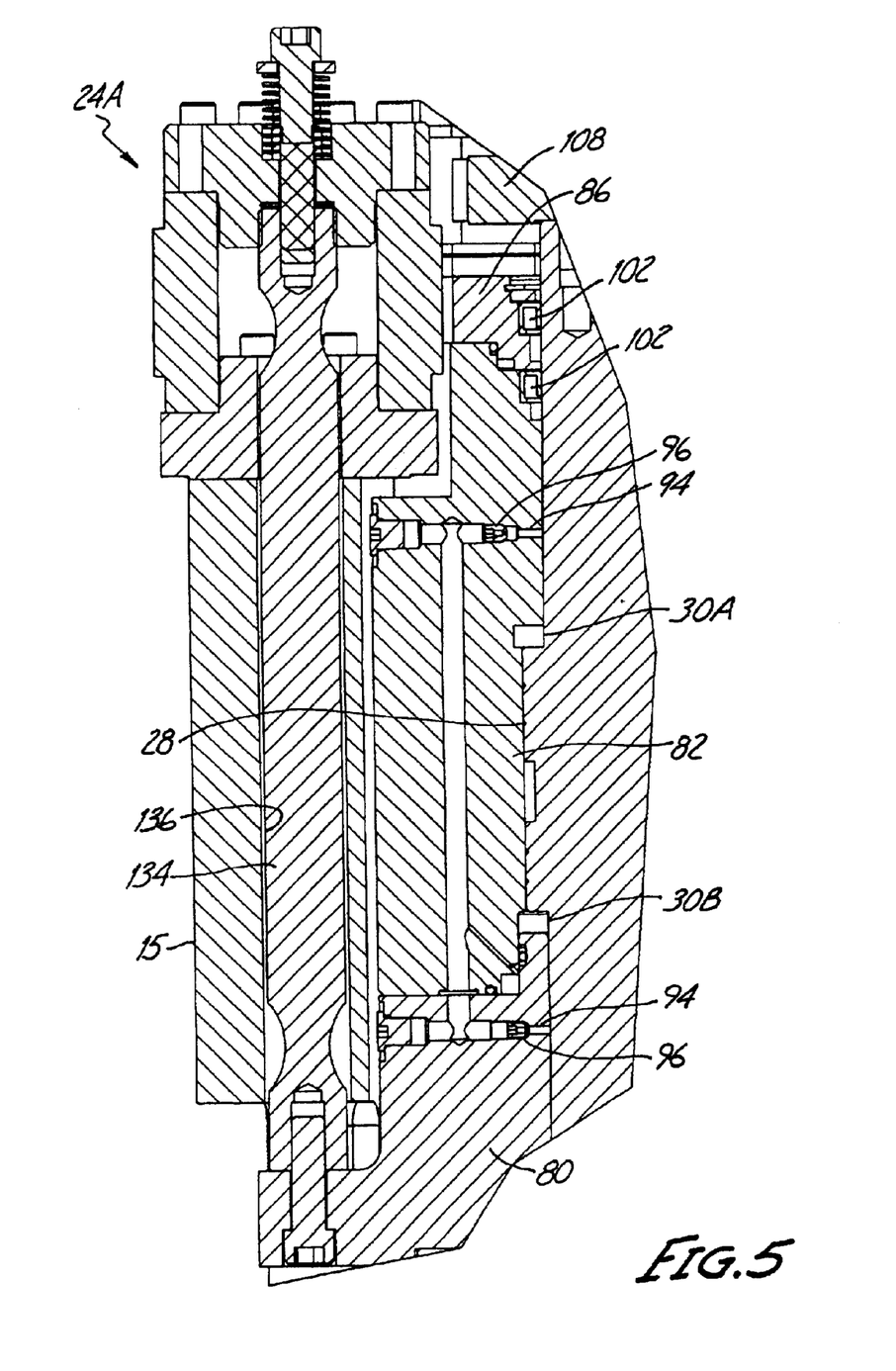
FIG. 5 is an enlarged sectional view of a portion of FIG. 2.
Figure 6:
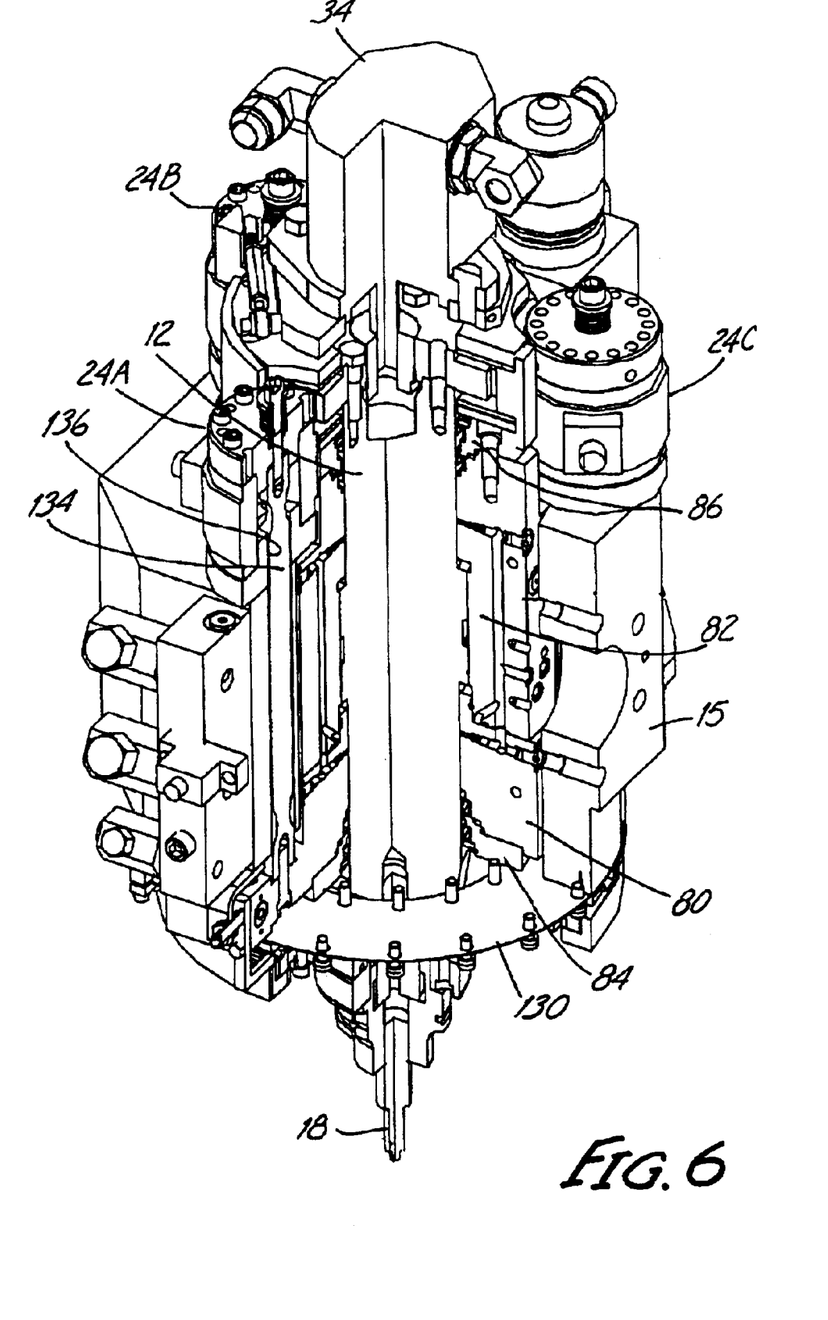
FIG. 6 is a perspective view of the spindle assembly with a portion removed.

In the exemplary embodiment illustrated, the motor 34 is directly coupled to the spindle shaft 16 to move axially along spindle axis 16A therewith. Referring also to FIG. 3, links 42 react the torque generated by the motor 34 to the support cylinder 12. The links 42 are pivotally coupled to the housing of the motor 34 and to the support cylinder 12 so as to allow axial movement of the motor 34 along the spindle axis 16A.

Generally, a speed sensor is provided in friction stir welding spindle assemblies in order to monitor the rotation speed of the spindle shaft. Any suitable form of the speed sensor can be used, the form of which does not directly pertain to the present invention. In the embodiment illustrated, a gear-like element 108 is coupled to an end of the spindle shaft 16 to rotate therewith. A sensor 109 detects the presence of each tooth of element 108, and thereby, provides an output signal indicative of the speed of the spindle shaft 16.

In a further embodiment, a displacement or position sensor 110 measures the axial position of the spindle shaft 16, for example, relative to the support cylinder 12. The displacement sensor 110 preferably does not contact the spindle shaft 16. In the embodiment illustrated, the displacement sensor 110 provides an output signal indicative of the position of the spindle shaft 16 relative to the cylinder 12 by measuring a gap between a conical portion 112 of the spindle shaft 16 and a sensor probe 118. As appreciated by those skilled in the art, the gap between the conical portion 112 and sensor probe 118 (see also FIG. 4) will vary with the axial position of the spindle shaft 16 along axis 16A. The sensor probe 118 is mounted to a bracket 120 that in turn is mounted to support cylinder 12. In the exemplary embodiment, an eddy current sensor is used; however, other proximity sensors can also be used. In yet a further embodiment as illustrated, at least two sensor probes 118 and 122 are provided wherein the probes 118, 122 are disposed about the spindle axis 16 in a known relationship, such as opposed to each other, such that output signals therefrom can be combined. For example, if the probes 118 and 122 are directly opposed from each other, then an average value can be measured for the gap present between the probes 118 and 120 and the conical portion 116 to eliminate any errors due to runout of the spindle shaft 16 or the like. If desired, another position sensor 123 can be operably connected to the support cylinder 12 to measure a distance to the end of the tool 18 or the workpieces being joined. For example, sensor 123 can be a laser-displacement sensor. Output signals from sensors 110 and 123 are typically used to ensure that the spindle assembly 10 is in a proper position relative to the workpieces such that the spindle shaft 16 can be displaced within its working range relative to support 12.

The sensors 110 and 123 are examples of suitable sensors for measuring the axial position of the spindle shaft 16 or elements connected thereto. As appreciated by those skilled in the art, other forms of position sensors can be used. Generally, one aspect of the present invention is a friction stir welding spindle assembly having the spindle shaft 16 and a bearing assembly 20 and/or 22 that allows rotation and axial displacement of the spindle shaft 16 and a position or displacement sensor that provides an output signal indicative of the axial position of the spindle shaft 16. In this manner, the friction stir welding spindle assembly can be operated in position control of the tool 18.

As indicated above, the load sensing device measures a load or force coincident with the spindle axis 16A can be a load cell. In the embodiment illustrated, three load cells equally spaced about the spindle axis 16A are used, the output signals therefrom being combined to yield the force along the spindle axis 16A. In effect, the support cylinder 12 and the spindle shaft 16 float on load cells 24A, 24B and 24C, which in turn, are coupled to the spindle base 15. The support cylinder 12 is also coupled to the base 15 with a flexure disc 130 (see also FIG. 6). The flexure disc 130 is stiff for torque about the spindle axis 16A as well as in shear forces perpendicular to axis 16A; however, the flexure 130 is compliant for a force parallel to the spindle axis 16A and moments about the axes perpendicular to the axis 16A. In this manner, the output signals from load cells 24A, 24B and 24C can be combined to yield the force along the spindle axis 16A as well moments about axes that are mutually perpendicular to each other and the spindle axis 16A.

In order to prevent a redundant load path and possible shearing of the load cells 24A, 24B and 24C, the load cells 24A, 24B and 24C are each coupled to the support cylinder 12 through long flexure rods 134 (see also FIG. 5), which extend within bores 136 formed in the spindle base 15. The flexures 134 are flexible in bending but are stiff axially. The load cell arrangement is compact minimizing overall size of the spindle assembly 10 as well as uses generally available or standard load cells 24A, 24B and 24C.

Although not directly pertinent to the present invention, a seam-tracking sensor 150 is mounted to the support cylinder 12 and can rotate about the spindle axis 16A. In particular, the seam-tracking sensor 150 is mounted to a support bracket 152, which in turn, is mounted through a large bearing assembly 156. A spur gear 160 is provided on the support cylinder 12 and is coupled to a gear 162 drivably connected to a motor 164. Operation of the motor allows the seam-tracking sensor 150 to rotate about the spindle 16A on the bearing assembly 156 to maintain its position.

Although the present invention has been described with reference to preferred embodiments, workers skilled in the art will recognize that changes may be made in form and detail without departing from the spirit and scope of the invention.

What is claimed is:

1. A friction stir welding spindle assembly comprising:
   a support having a center bore;
   a spindle shaft adapted to support a stir welding tool and having a portion cooperating with the support to form an actuator adapted to cause axial displacement of the spindle shaft relative to the support;
   a bearing operably coupled to surfaces of the spindle shaft and the support that face each other, the bearing allowing continuous, unlimited revolutions of the spindle shaft relative to the support and axial displacement of the spindle shaft relative to the support during such revolutions; and
   a sensing device adapted to provide an output signal indicative of at least one of a force coincident with axial displacement of the spindle shaft and an axial position of the spindle shaft.

2. The friction stir welding spindle assembly of claim 1 wherein the support comprises a support cylinder and the portion of the spindle shaft cooperates with an inner surface of the bore to form pressurizable chambers which when pressurized will cause axial displacement of the spindle shaft relative to the support cylinder.

3. The friction stir welding spindle assembly of claim 2 and further comprising a drain port opening to an inner surface of the support cylinder opposite said portion of the spindle shaft.

4. The friction stir welding spindle assembly of claim 3 wherein the spindle shaft includes a passageway fluidly coupled to a pressurizable port formed in the support cylinder.

5. The friction stir welding spindle assembly of claim 4 wherein the passageway is fluidly coupled to a fluidly operable tool holder adapted to hold the stir welding tool disposed at an end of the spindle shaft.

6. The friction stir welding spindle assembly of claim 4 wherein the pressurizable port comprises the drain port.

7. The friction stir welding spindle assembly of claim 2 wherein the sensing device comprises a pressure sensor sensing pressures in the chambers.

8. The friction stir welding spindle assembly of claim 1 wherein the sensing device comprises a load cell.

9. The friction stir welding spindle assembly of claim 1 and further comprising:
   a spindle base; and
   wherein the sensing device comprises a load cell coupling the support to the spindle base.

10. The friction stir welding spindle assembly of claim 9 and further comprising a plurality of load cells coupling the support to the spindle base, the load cells being spaced-apart and disposed about the spindle shaft.

11. The friction stir welding spindle assembly of claim 10 and further comprising a flexure disc coupling the support to the load cells.

12. The friction stir welding spindle assembly of claim 1 and further comprising a motor coupled to the spindle shaft.

13. The friction stir welding spindle assembly of claim 12 wherein the motor moves axially with the spindle shaft.

14. The friction stir welding spindle assembly of claim 13 and further comprising a reaction member coupling the motor to the support.

15. The friction stir welding spindle assembly of claim 12 and further comprising a flexible coupling coupling an output shaft of the motor to the spindle shaft.

16. The friction stir welding spindle assembly of claim 15 wherein the spindle shaft moves relative to the motor.

17. The friction stir welding spindle assembly of claim 1 and further comprising an axial position sensor operably coupled to the spindle shaft and the support.

18. The friction stir welding spindle assembly of claim 17 wherein the axial position sensor does not contact the spindle shaft.

19. The friction stir welding spindle assembly of claim 18 wherein the axial position sensor comprises an eddy current sensor.

20. The friction stir welding spindle assembly of claim 18 wherein the spindle shaft includes a conical portion operable with the axial position sensor, wherein a gap between the conical portion of the spindle shaft and the axial position sensor varies as a function of axial displacement of the spindle shaft.

21. The friction stir welding spindle assembly of claim 20 and further comprising a second non-contact axial position sensor operable with the conical portion of the spindle shaft.

22. The friction stir welding spindle assembly of claim 1 wherein the bearing comprises a magnetic bearing.

23. The friction stir welding spindle assembly of claim 1 wherein the bearing comprises a hydrostatic bearing.

24. The friction stir welding spindle assembly of claim 23 and further comprising a second bearing operably coupled to surfaces of the spindle shaft and the support that face each other, the second bearing allowing continuous, unlimited revolutions of the spindle shaft relative to the support and axial displacement of the spindle shaft relative to the support during such revolutions, said portion of the spindle shaft being disposed between the first-mentioned bearing and the second bearing.

25. The friction stir welding spindle assembly of claim 1 wherein the first-mentioned bearing and the second bearing each comprise a hydrostatic bearing.

26. A friction stir welding spindle assembly comprising:
a support having a center bore;
a spindle shaft adapted to support a stir welding tool;
a bearing operably coupled to surfaces of the spindle shaft and the support that face each other, the bearing allowing continuous, unlimited revolutions of the spindle shaft relative to the support and axial displacement of the spindle shaft in the bore relative to the support during such revolutions; and
a load sensing device adapted to provide an output signal indicative of a force coincident with axial displacement of the spindle shaft.

27. The friction stir welding spindle assembly of claim 26 wherein the load sensing device comprises a load cell.

28. The friction stir welding spindle assembly of claim 26 and further comprising:
a spindle base; and
a load cell coupling the support to the spindle base.

29. The friction stir welding spindle assembly of claim 28 and further comprising a plurality of load cells coupling the support to the spindle base, the load cells being spaced-apart and disposed about the spindle shaft.

30. The friction stir welding spindle assembly of claim 29 and further comprising a flexure disc coupling the support to each of the load cells.

31. A friction stir welding spindle assembly comprising:
a base;
means for forming an actuator having a spindle shaft adapted to support a stir welding tool;
a bearing operably coupled to surfaces of the spindle shaft and the support that face each other, the bearing allowing continuous, unlimited revolutions of the spindle shaft relative to the support and axial displacement of the spindle shaft with respect to a spindle axis during such revolutions; and
means for providing an output signal indicative of at least one of a force coincident with axial displacement of the spindle shaft with respect to the base and an axial position of the spindle shaft.

* * * * *